March 7, 1972  G. S. ALBERTS ET AL  3,647,643
PROCESS OF FABRICATING A HYBRID MAGNETIC FILM
Filed Sept. 29, 1969  2 Sheets-Sheet 1

INVENTORS.
GENE S. ALBERTS
BARRY L. FLUR

ATTORNEY

United States Patent Office 3,647,643
Patented Mar. 7, 1972

3,647,643
PROCESS OF FABRICATING A HYBRID
MAGNETIC FILM
Gene S. Alberts, Essex Junction, and Barry L. Flur,
Burlington, Vt., assignors to International Business
Machines Corporation, Armonk, N.Y.
Filed Sept. 29, 1969, Ser. No. 861,883
Int. Cl. C23b 5/46, 5/48; G11b 5/00
U.S. Cl. 204—15
10 Claims

ABSTRACT OF THE DISCLOSURE

Multilayer magnetic film devices are prepared in which a first magnetic film is vacuum deposited, and a second magnetic film is electroplated. The first magnetic film is vacuum evaporated on a suitable substrate, such as silicon monoxide-coated or polyimide-coated metal. An electrically continuous copper layer is vacuum evaporated on the first magnetic film. An additional thickness of copper is electroplated on the electrically continuous copper layer. A second magnetic film is then electroplated on the additional thickness of copper. The layers so deposited may then be etched into an array of magnetic film devices in a single step etching process, using a suitable etchant for both the magnetic films and the copper, such as ferric chloride in the case of nickel-iron magnetic films. Single step etching results in better definition, allowing substantially greater density of individual storage locations in a memory employing the magnetic film devices.

FIELD OF THE INVENTION

This invention relates to a process for producing a magnetic film memory device and to magnetic memory devices so produced. More particularly, the invention relates to a process in which both vacuum deposition and electrodeposition are used to make a memory device comprising multilayer magnetic films in order to provide a multilayer magnetic film structure that can be etched in a single step.

DESCRIPTION OF THE PRIOR ART

U.S. Pat. 3,375,503 to B. I. Bertelsen describes a magnetic film device comprising two nickel-iron magnetic films with a copper conducting layer and silicon monoxide layers disposed between them and teaches that magnetic film devices may be made by either vacuum deposition or electrodeposition.

When fabrication of magnetic films is carried out by vacuum evaporation, temperatures of 350° C. or higher are typically employed for the substrate in order to produce a magnetic film having the desired properties and suitable adhesion to the substrate. At these temperatures, if a copper layer is in direct contact with a magnetic film, copper will diffuse into the magnetic film, thus altering its properties.

In order to prevent unpredictable changes in magnetic film properties from copper diffusion, interlayers of silicon monoxide, as taught by Bertelsen, or chromium are provided between magnetic films and copper layers when vacuum evaporation is used to make multilayer films. While such interlayers have been highly successful in preventing diffusion of copper into the magnetic films, the use of such interlayers means that several etching steps are necessary to produce an array of magnetic film devices, because there is no known suitable single etchant for the magnetic films, the copper layers, and the silicon monoxide interlayers.

A known alternative approach is to eliminate the silicon monoxide interlayers and electroplate the magnetic films and copper interlayer. Such a process may be carried out at much lower temperatures, at which copper diffusion into the magnetic films is not a problem. This approach has also been highly successful in preventing the copper diffusion phenomenon, but it has been found necessary to provide a chromium layer between electroplated magnetic films and their supporting substrate, in order to provide adequate adhesion between the bottom magnetic film and the substrate. Again, there is no suitable single etchant for the magnetic films, the copper layer, and the chromium adhesion layer. A single etching step therefore cannot be used to etch such electroplated magnetic films into an array of memory devices.

Any time multiple etchants, multiple photoresist steps, or both must be employed a significantly more complex, costly and time consuming process which tends to produce lower quality line definition results. Such lower quality line widths limit the number of individual storage locations, or bits, that can be packed in a given area. This is a severe handicap in the case of large capacity memories.

A need therefore remains for further development of simplified magnetic film fabrication processes.

SUMMARY OF THE INVENTION

Accordingly, it is an object of this invention to produce a multilayer magnetic film that can be etched into an array by a single etching step.

It is another object of the invention to provide a multilayer magnetic film structure that can be etched into individual storage locations at a density suitable for large capacity memory applications.

It is a further object of the invention to fabricate multilayer magnetic films having a copper conducting layer between them with no substantial changes in magnetic film properties due to diffusion of copper into the magnetic films, and which can be etched into an array by a single etching step.

It is another object of the invention to eliminate the necessity for adhesion layers between a magnetic film and its supporting substrate and interlayers between multilayer magnetic films to prevent diffusion of copper from conducting lines into the magnetic films.

These and other related objects may be obtained by employing the multilayer magnetic film fabrication process disclosed herein. To carry out the process, a first magnetic film is vacuum deposited on a suitable substrate, such as an insulated metal plate. At least an electrically continuous copper layer is then vacuum deposited on the first magnetic film. At this point, instead of continuing with vacuum deposition, an additional thickness of copper is then electroplated on the electrically continuous copper layer, the electrically continuous copper layer serving to provide adequate adhesion for the electroplated additional copper thickness. A second magnetic film is then electroplated on the electroplated additional thickness of copper.

The foregoing and other objects, features, and advantages of the invention will be apparent from the following more particular description of the preferred embodiments of the invention, as illustrated in the accompanying drawings.

DETAILED DESCRIPTION OF THE INVENTION

Figure 3:
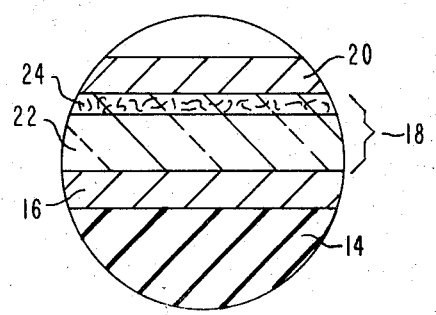
FIG. 3 is an enlarged view of area 3 in FIG. 2, showing detail of the layers.

The deposition process of this invention may be carried out on essentially any substrate suitable for fabrication of magnetic film devices. Both non-conducting materials, such as glass, and metals, such as copper or aluminum, may be employed. If a metal substrate is used, it should have a smoothing and insulating layer, such as silicon monoxide or a heat stable polymer, such as polyimide. If silicon monoxide is employed as the insulating layer, a chromium adhesion layer should be employed between the metal substrate and the silicon monoxide insulating layer. If polyimide is used as the insulating layer, a nickel layer should be used to give it satisfactory adhesion to the metal. If silicon monoxide is used as the insulating layer, it is necessary to vacuum deposit the electrically continuous copper layer to a thickness of at least about 2,000 angstroms. With a polyimide insulating layer, it is only necessary to vacuum deposit the electrically continuous copper layer to a thickness of at least about 100 angstroms. The reason for this difference is not altogether clear, but is believed to be due to differences in adhesion between the respective insulating layers and the first magnetic film, together with internal stresses of the magnetic films and the copper layer.

Both the vacuum deposited and electroplated magnetic films are preferably of the permalloy type, i.e., are nickel-iron alloys. Such alloys usually contain about a 4:1 to 5:1 weight ratio of nickel to iron and may additionally contain up to 10 weight percent of one or more other components, such as chromium, palladium, copper, manganese, platinum, gold, or the like, or up to 50 weight percent cobalt. Especially preferred are the alloys consisting essentially of a weight ratio of about 4:5 parts nickel to 1 part iron and from 0 to 50 weight percent cobalt. Alternatively, the magnetic films could be pure nickel, iron, or cobalt, or any other combination of ferromagnetic elements, particularly where zero magnetostriction is not a requirement.

The vacuum deposition portion of the invention may be carried out using conventional techniques and apparatus. For example, the first magnetic film and electrically continuous copper may be vacuum evaporated using apparatus and deposition parameters disclosed in commonly assigned U.S. patent application Ser. No. 669,053, filed Sept. 20, 1967, by W. B. Archey and now Pat. No. 3,525,638, the disclosure of which is incorporated herein by reference. Alternatively, a sputtering process of the type described in commonly assigned U.S. Pat. 3,303,116, to L. I. Maissel et al. may be employed, the disclosure of which is also incorporated herein by reference.

The vacuum deposited and electroplated magnetic films are usually deposited in thicknesses of from about 100 to about 2,000 angstroms, although thicker magnetic films may be used for specialized applications. Thicknesses of between about 200 and 1,500 angstroms are particularly preferred.

The electroplated additional copper thickness and second magnetic film may be deposited according to known electroplating techniques. Particularly preferred are the processes described in commonly assigned U.S. patent application Ser. No. 737,367, filed June 17, 1968, by J. M. Brownlow and U.S. patent application Ser. No. 737,350, filed June 17, 1968 by G. S. Alberts et al. and now Pat. No. 3,520,784, the disclosures of which are incorporated by reference herein. The additional copper thickness is generally electroplated in a thickness of from 100 to 10,000 angstroms, with a thickness of from 3,000 to 5,000 angstroms being preferred, in order to give correct grain size and/or smoothing in order to allow electroplating of suitable magnetic films directly on the copper layer. In addition, the copper layer could be increased by electroplating high conductivity copper on the evaporated copper, and then electroplating the above copper smoothing layer.

After electrodeposition of the second magnetic film has been completed, the layers may be etched down to the substrate in order to provide an array of magnetic film devices. To form the array, photoresist is applied to the surface of the electroplated second magnetic film and exposed and developed in the conventional manner to form a coating of photoresist over those areas of the magnetic films which will form the finished array. The exposed areas of the structure are then contacted with a suitable etchant for the magnetic films and the copper disposed between them. Suitable examples of such etchants include ferric chloride, nitric acid, potassium ferrocyanide, zinc-activated hydrochloric acid, ammonium persulfate, and the like. The preferred etchant is an aqueous ferric chloride solution. Since the process of this invention eliminates the necessity for silicon monoxide interlayers between the magnetic films and the copper disposed between them, in the case of an all evaporated magnetic film device, and the need for a chromium adhesion layer between the substrate and the first magnetic film, in the case of an all electroplated magnetic film device, the structure need only undergo a single photoresist and etching step to give a desired etched array of magnetic film devices. This advantage significantly reduces process steps and improves definition of the resulting etched magnetic film devices. As a result, densities of greater than 60,000 bits per square inch are possible in memory arrays fabricated using the process of this invention.

Figure 1:
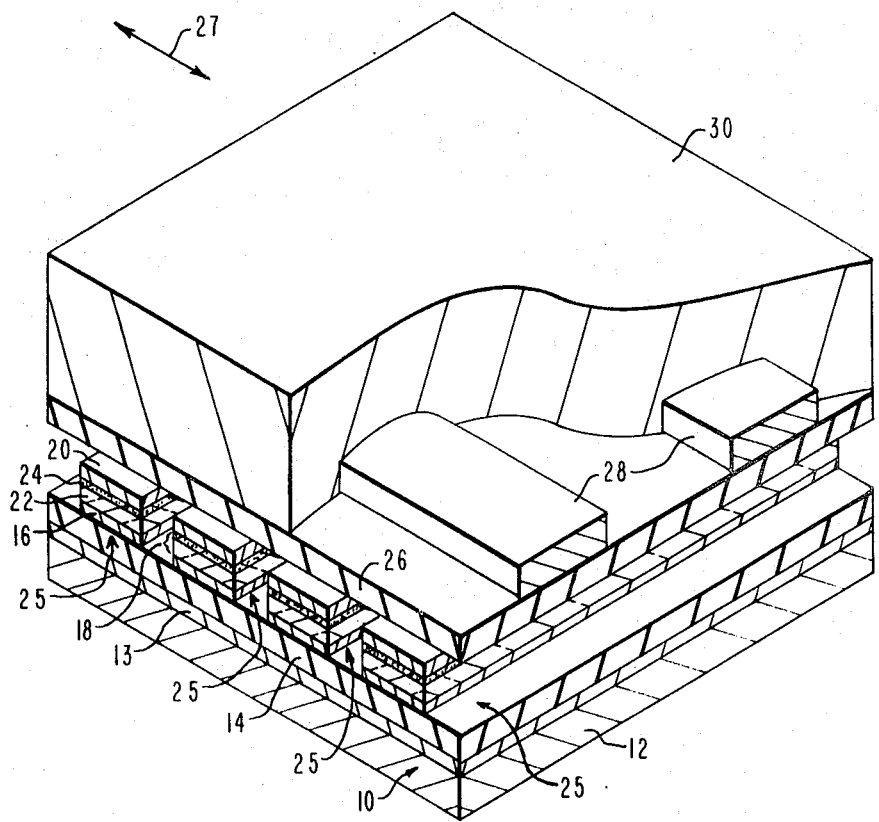
FIG. 1 is a perspective view showing a portion of an array of magnetic film devices fabricated in accordance with the invention.

Turning now to the drawings, more particularly to FIG. 1, there is shown an example of a preferred array of magnetic film devices fabricated in accordance with the invention. The substrate 10 for the array consists of a silver bearing copper plate 12 smoothed to a finish of about 1 microinch, a 1,000 angstrom thickness electrolessly plated nickel adhesion layer 13, and a polyimide insulating layer 14 having a thickness of 9 microns. The polyimide insulating layer 14 is applied by silk screening in a plurality of coats to the desired thickness. Vacuum evaporated first magnetic film 16 is deposited on polyimide layer 14 to a thickness of 1,000 angstroms, and consists essentially of a zero magnetistrictive nickel-iron-cobalt alloy. Copper layer 18 separates vacuum evaporated first magnetic film 16 and electroplated second magnetic film 20. Copper layer 18 consists of a vacuum evaporated electrically continuous copper layer 22 which is usually vacuum evaporated to a thickness of 3 microns to give sufficient bulk for current conduction. An additional electroplated thickness 24 of copper having a thickness of 3,000 angstroms completes the copper layer 18 separating the vacuum evaporated first magnetic film 16 and the electroplated second magnetic film 20, and serves to give a suitable grain size and smoothness to the copper layer 18 for electroplating magnetic film 20 directly thereon.

The second magnetic film 20, also consisting essentially of a zero magnetistrictive nickel-iron-cobalt alloy, is electroplated to a thickness of 1,000 angstroms. In the structure shown, the two magnetic films 16 and 20 and the copper layer 18 have been etched into a plurality of strips 25. The material between the strips 25 is completely removed down to polyimide insulating layer 14. Both the vacuum evaporated magnetic film 16 and the electroplated magnetic film 20 have easy axes in the direction of arrow 27, established by an orienting magnetic field during deposition.

The copper layer 18 serves as a bit/sense line in the completed memory array. Over the second magnetic film 20 is another 9 micron layer 26 of polyimide, which serves to insulate copper word lines 28 from second magnetic film 20, and a cast ferrite keeper 30 of 20 mils thickness to complete the layered structure. In the completed array, the bit/sense lines (copper layers 18) are connected to suitable drive and sense circuitry (not shown), and the word lines 28 are connected to drive circuitry (also not shown). Selective energization of the word lines 28 serves to sense on the bit/sense lines 18 information stored in the array and, by using simultaneous currents on the word lines 28 and the bit/sense lines 18, information is written into the array in a known manner.

It should be recognized that FIG. 1 represents a very small portion of an actual memory array. A typical large capacity memory array fabricated in accordance with the invention would contain about five million individual storage locations on a substrate 10 measuring ten inches by ten inches. Each storage location is formed in the magnetic films 16 and 20 at an intersection of a bit/sense line 18 and a word line 28.

Figure 2:
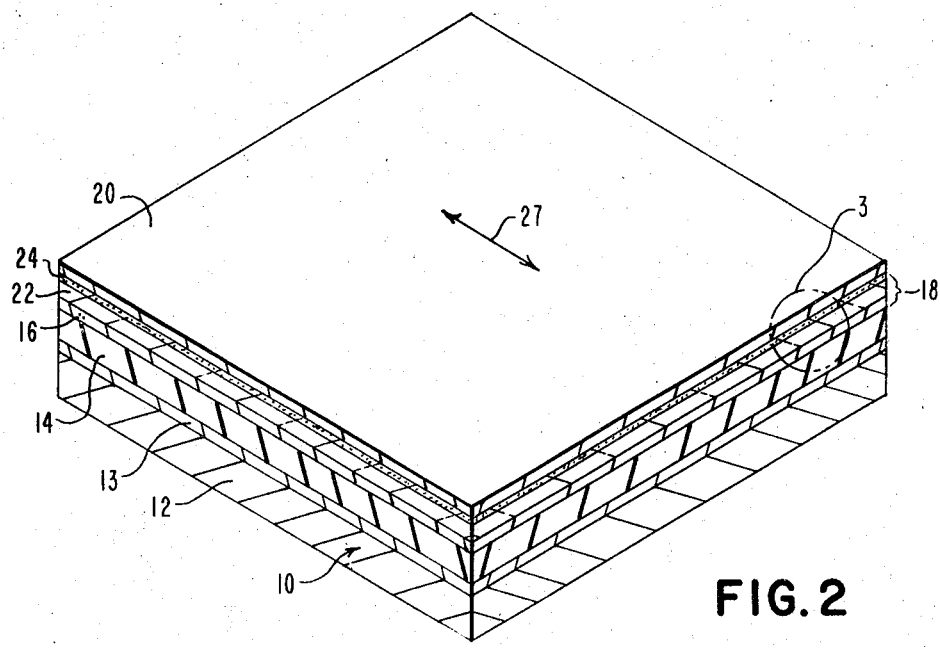
FIG. 2 is a perspective view showing magnetic film and copper layers deposited in accordance with the invention.
Figure 4:
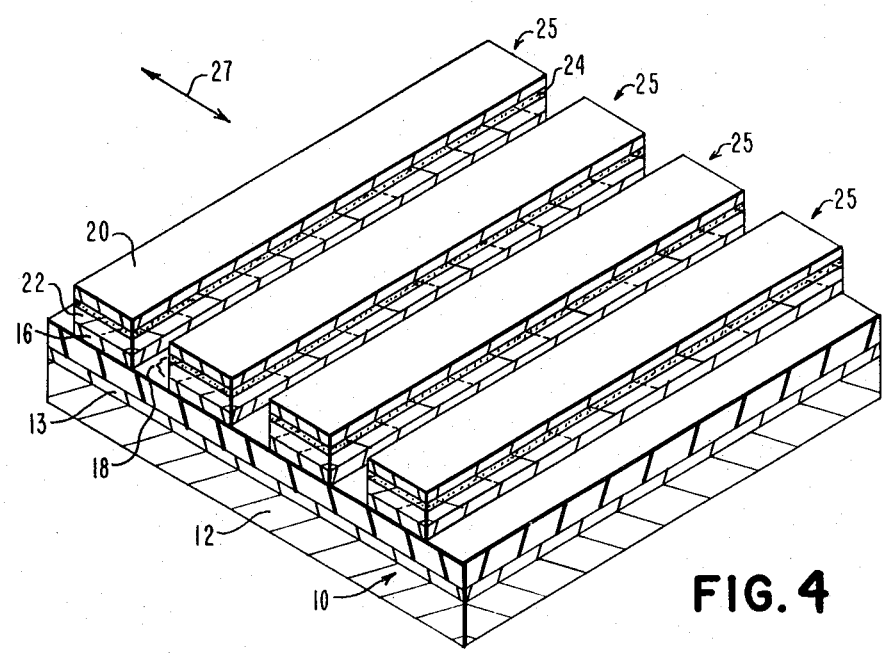
FIG. 4 is a perspective view showing the layers of FIG. 2 after further processing.

FIGS. 2, 3, and 4 serve to describe in more detail a preferred form of the novel hybrid magnetic film fabrication process used in making the structure of FIG. 1. Smoothed silver bearing copper plate 12 with nickel adhesion layer 13 and insulated by polyimide layer 14 is provided by polishing and lapping the plate 12 to a finish of about 1 microinch, depositing nickel by electroless plating to a thickness of 1,000 angstroms, and silk screening a plurality of layers of a commercially available Du Pont 5057 "Pyre ML" polyimide to a cured thickness of 9 microns. First nickel-iron cobalt magnetic film 16 is vacuum evaporated to a thickness of 1,000 angstroms in the presence of an orienting magnetic field of 40 oersteds at a deposition rate of about 17 angstroms per second from an RF heated crucible while maintaining the substrate 10 at a temperature of 350° C., in a vacuum atmosphere of less than $1 \times 10^{-5}$ torr, in apparatus of the types described in the abovementioned co-pending Archey application. Alternatively, a conventional single shot evaporator may be employed.

Electrically continuous copper layer 22 is vacuum evaporated in the same atmosphere to a thickness of 3 microns at a deposition rate of 90 angstroms per second, while maintaining a substrate temperature of 200° C. At this lower substrate temperature, diffusion of the copper into magnetic film 16 is not observed.

Copper layer 24 is then electroplated on vacuum evaporated copper layer 22 to an additional thickness of 3,000 angstroms in an electroplating bath having the following composition:

| Ingredient | Operable | Preferred |
|---|---|---|
| Demineralized $H_2O$, l | 1 | 1 |
| $H_2SO_4$, moles | 0.060–0.37 | 0.100 |
| $Cu(NO_3)_2 \cdot H_2O$, moles | 0.032–0.40 | 0.100 |
| Tartaric acid, moles | 0.007–0.04 | 0.020 |
| Gelatin, g | 0.10–0.50 | 0.15 |
| Triton X-100, g | 0.3–0.8 | 0.60 |

Electroplating of this copper layer 24 is carried out with a constant plating current of 160 milliamperes per square inch with constant agitation. A total plating time of one and a half minutes is needed to obtain the 3,000 angstrom layer.

The second magnetic film 24 is plated to a thickness of 1,000 angstroms at room temperature in a bath of the following composition:

| Ingredient | Operable | Preferred |
|---|---|---|
| Demineralized $H_2O$, l | 1 | 1 |
| $NiSO_4 \cdot 6H_2O$, g | 10.0–30.0 | 20 |
| $FeSO_4 \cdot 7H_2O$, g | 1.0–8.0 | 1.7 |
| $CoSO_4 \cdot 7H_2O$, g | 0–60 | 1.7 |
| $CuSO_4 \cdot 5H_2O$, g | 0.5–3.0 | 0.5 |
| Triton X-100, g | 0.2–0.6 | 0.4 |
| Saccharin, Na, g | 0.05–2.0 | 0.15 |
| Sodium potassium tartrate, g | 5.0–10.0 | 10.0 |

The plating operation is carried out using the pulse plating techniques of the above-mentioned co-pending Brownlow application using the following one minute sequence: ten seconds of constant current plating at a current density of about 45 milliamperes per square inch, four seconds of violent agitation, and 46 seconds of resting to allow convection to damp out before the plating pulse is repeated. A plating rate of 140 angstroms per pulse of the above sequence is obtained and an external 40 oersted orienting magnetic field is utilized. A total plating time of 7 minutes is required for the 1,000 angstrom thickness.

After electrodeposition of the second magnetic film 20 has been completed, the structure of FIG. 2 is given an anneal in air in a 40 oersted easy axis magnetic field for three hours in an oven initially at room temperature and heated to 180° C., to give an effective anneal time of about two hours at 180° C. The anneal stabilizes the magnetic properties of the electroplated magnetic film 20. Again, these temperatures are low enough so that diffusion of copper from layers 22 and 24 into magnetic films 16 or 20 is not observed.

To obtain the strip structure shown in FIG. 4, the completed structure of FIG. 2 is coated with photoresist according to conventional techniques over the areas which will form strips 25. The exposed areas of the structure are contacted with a solution of 30° Baumé ferric chloride diluted with 3 parts by volume water to 1 part by volume ferric chloride solution. A total etching time of about 30 seconds at room temperature is necessary to remove the exposed areas of 1,000 angstrom thick magnetic film 20, three microns thick copper layers 24 and 22 and 1,000 angstrom thick magnetic film 16 to give the structure shown in FIG. 4.

To complete the structure of FIG. 1, a second polyimide insulating layer 26 is silk screened in a plurality of coats over coupled magnetic film strips 25 to a thickness of about 9 microns. Word lines 28 are obtained by vacuum evaporating copper at a substrate temperature of 100° C. with the same vacuum and deposition rates as for copper layer 22. The word lines 28 are defined by conventional photoresist and ferric chloride etching steps. Ferrite keeper 30 is applied from a dispersion of powdered ferrite in an organic binder by casting to a thickness of 20 mils.

The following non-limiting examples are preferred embodiments and serve to describe the invention further.

EXAMPLE 1

Polyimide insulated silver bearing copper substrates are prepared as described above. Magnetic film 16 is vacuum evaporated on polyimide layer 14 under the conditions described above to a total thickness of about 1,000 angstroms, from a melt consisting of 79 weight percent nickel, 16 weight percent iron, and 5 weight percent cobalt. First copper layer 22 is evaporated under the conditions described above to a thickness of 30,000 angstroms. Additional copper thickness of 3,000 angstroms is electroplated with a constant current of about 190 milliamperes per square inch using the preferred copper plating bath described above. Second magnetic film 20 is pulse plated from a bath having the preferred composition described above, but containing no $CoSO_4 \cdot 7H_2O$. The plating conditions described above are used to obtain a film with a thickness of 1,000 angstroms.

The resulting structure is etched into strips on the substrate using ferric chloride etch in a single step etching process as described above. The structure shown in FIG. 1 is completed by silk screening of a second polyimide layer 26, vacuum deposition of copper word lines 28, and casting of keeper 30, as above. The resulting structure has good adhesion and is suitable for use as a magnetic memory with a storage density of about 8,000 bits per square inch.

If vacuum evaporated copper layer 22 is eliminated, the electroplated copper layer 24 and magnetic film 20 slough off the rest of the structure when further processing of them is attempted.

EXAMPLE 2

The procedure of Example 1 is repeated, except that a vacuum deposited chromium adhesion layer 13 is used in place of the electroless nickel in Example 1, and a vacuum evaporated silicon monoxide insulating layer with a thickness of 12 microns is used in place of the polyimide insulating layer 14 in Example 1. The melt composition for the evaporated magnetic film 16 is changed to 80 weight percent nickel, 17 weight percent iron, and 3 weight percent cobalt, to give a magnetic film 16 on silicon monoxide with equivalent magnetic properties to the magnetic film 16 on polyimide in Example 1. The thickness of evaporated electrically continuous copper layer 22 is increased to 3 microns in order to insure adequate adhesion of the subsequent layers. The resulting magnetic film structure shows good adhesion and is suitable for use as magnetic memory devices, with the same density as in Example 1.

If the vacuum evaporated copper layer has a thickness of less than about 2,000 angstroms, adhesion of the electroplated magnetic film 20 is poor, and the resulting structure cannot be used for a reliable magnetic memory.

EXAMPLE 3

The procedure of Examples 1 and 2 is repeated, but with an alteration of the magnetic film composition in order to increase the anisotropy field ($H_k$) of the magnetic films 16 and 20 by increasing it to 9 oersted. With the polyimide insulation layers as in Example 1, the vacuum evaporation melt is changed to 74 weight percent nickel, 17 weight percent iron, and 9 weight percent cobalt. With the silicon monoxide insulation layers, as in Example 2, a melt composition of 76 weight percent nickel, 17 weight percent iron, and 7 weight percent cobalt is necessary to obtain an $H_k$ of 9 oersted.

For the electrodeposition of magnetic film 20, the bath composition is altered by providing 0.3 gram per liter $CoSO_4 \cdot 7H_2O$ to give a magnetic film having an $H_k$ of 9 oersted.

The devices fabricated with these modifications in the process operate even better as magnetic film memory devices than those of Examples 1 and 2, exhibiting wider operating margins and higher flux output, allowing a density increase to 15,000 bits per square inch.

EXAMPLE 4

The procedure of Examples 1 and 2 is repeated, but with a further increase in the cobalt content of magnetic films 16 and 20 in order to produce an $H_k$ of 20 oersted and a coercive force ($H_c$) of 6 oersted with a film thickness of 1,000 angstroms. For the evaporated magnetic film 16 on polyimide, a melt composition of 63 weight percent nickel, 12 weight percent iron, and 25 weight percent cobalt is employed. For vacuum evaporation on silicon monoxide, the cobalt concentration is increased from 7 weight percent to 10 weight percent, to give a melt composition of 67 weight percent nickel, 14 weight percent iron, and 19 weight percent cobalt. For the electroplated magnetic film 20, the cobalt concentration of Example 3 is increased by providing 1.7 grams per liter $CoSO_4 \cdot 7H_2O$ to the bath of Example 1.

The result is to increase flux output and operating margins of the magnetic films so produced sufficiently to allow a reduction in the size of the devices by more than four times, to a density of at least 60,000 bits per square inch.

The above examples show operability of the claimed process to produce adhesion in multilayer magnetic film structures sufficient for memory use without requiring the use of adhesion layers between one of the magnetic films and the insulated substrate. Alternatively, the use of higher deposition temperatures, requiring the use of silicon monoxide or chromium interlayers is avoided. Elimination of these layers results in single step etch capability. As a result, better etching control is obtained, allowing the significant increases in bit density reported above to be reliably obtained. The examples further show that the process parameters employed during practice of the invention can be varied in the conventional manner for the fabrication of magnetic film memory devices. It should be apparent that, by utilizing both vacuum deposition and electroplating steps in the fabrication of multilayer magnetic film devices in accordance with the invention, a simplified process has been provided capable of fabricating magnetic film devices superior to those obtained through use of either vacuum deposition or electroplating techniques alone. While the above examples utilize vacuum evaporation to deposit the first magnetic film, the first magnetic film may also be sputter deposited, and the term "vacuum deposition" as used herein is intended to over both vacuum evaporation and sputtering.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A process for making a magnetic film device, which comprises:
   (A) vacuum depositing a first magnetic film on an insulated substrate,
   (B) vacuum depositing an electrically continuous copper layer on said first magnetic film,
   (C) electroplating an additional thickness of copper on said electrically continuous copper layer, and
   (D) electroplating a second magnetic film on said additional thickness of copper.

2. The process of claim 1 in which said substrate is a metal insulated with silicon monoxide and said electrically continuous copper layer is vacuum deposited to a thickness of at least about 2,000 angstroms.

3. The process of claim 2 in which said magnetic films comprise an alloy of nickel and iron.

4. The process of claim 3 in which said magnetic films consist essentially of a weight ratio of about 4 to 5 parts nickel to 1 part iron and from 0 to 50 percent cobalt.

5. The process of claim 1 in which said substrate is a metal insulated with a polyimide and said electrically continuous copper layer is vacuum deposited to a thickness of at least about 100 angstroms.

6. The process of claim 5 in which said magnetic films comprise an alloy of nickel and iron.

7. The process of claim 5 in which said magnetic films consist essentially of a weight ratio of about 4 to 5 parts nickel to 1 part iron and from 0 to 50 percent cobalt.

8. A process for making an array of magnetic film devices, which comprises:
   (A) vacuum depositing a first magnetic film on an insulated substrate,
   (B) vacuum depositing an electrically continuous copper layer on said first magnetic film,
   (C) electroplating an additional thickness of copper on said electrically continuous copper layer,
   (D) electroplating a second magnetic film on said additional thickness of copper,
   (E) masking the films in a pattern to produce the array, and
   (F) contacting unmasked portions of said films and said copper with an etchant suitable for both said magnetic films and for copper until the unmasked portions of said magnetic films, electrically continuous copper layer, and additional thickness of copper are etched away to said substrate.

9. The process of claim 8 in which the magnetic films comprise an alloy of nickel and iron and the etchant comprises ferric chloride.

10. The process of claim 9 in which said magnetic films consist essentially of a weight ratio of about 4 parts nickel to 1 part iron and from 0 to 50 weight percent cobalt, said substrate is a metal insulated with a polyimide, and said electrically continuous copper layer is vacuum deposited to a thickness of at least about 100 angstroms.

References Cited

UNITED STATES PATENTS 3,375,503   3/1968   Bertelsen _____ 340—174
3,524,174   8/1970   Wolf _____ 204—41

JOHN H. MACK, Primary Examiner

T. TUFARIELLO, Assistant Examiner

U.S. Cl. X.R.

204—40; 340—174 TF